Dec. 17, 1929. L. DAVIS 1,739,785
ROCKING BABY CARRIAGE
Filed Dec. 6, 1927 2 Sheets-Sheet 2
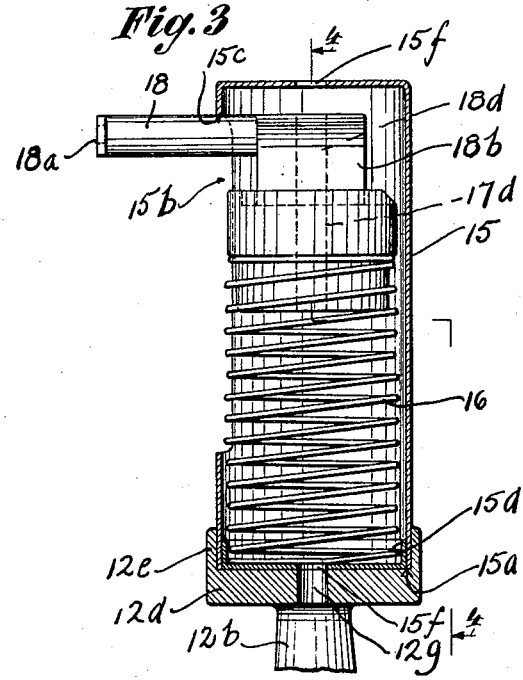
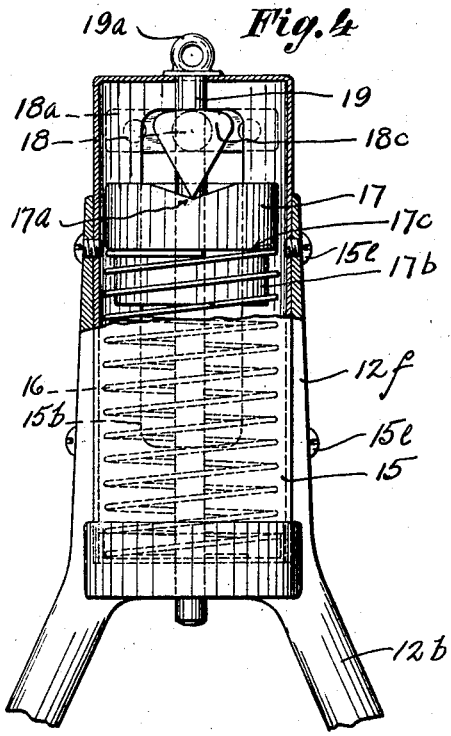
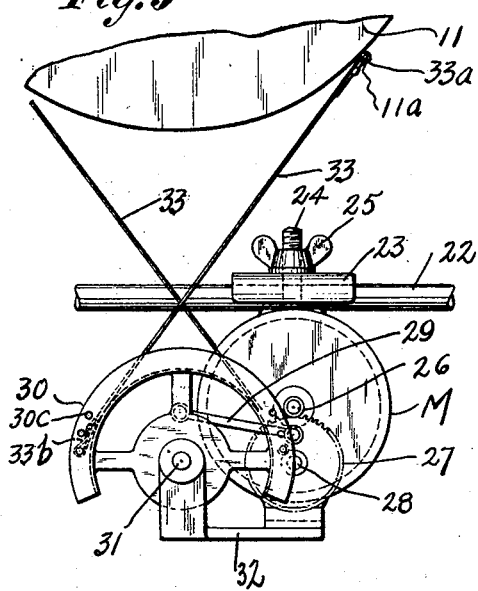
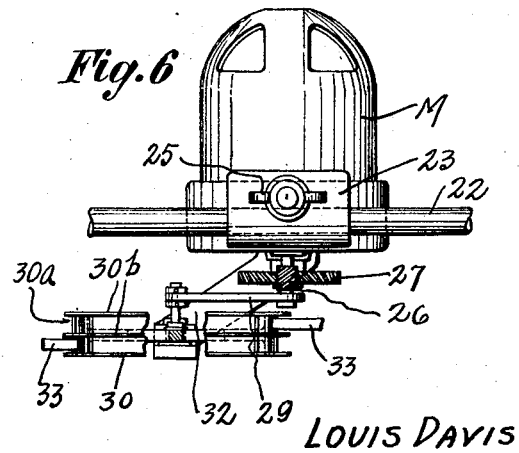
LOUIS DAVIS
Inventor
By his attorney Julian J. Wittal Patented Dec. 17, 1929

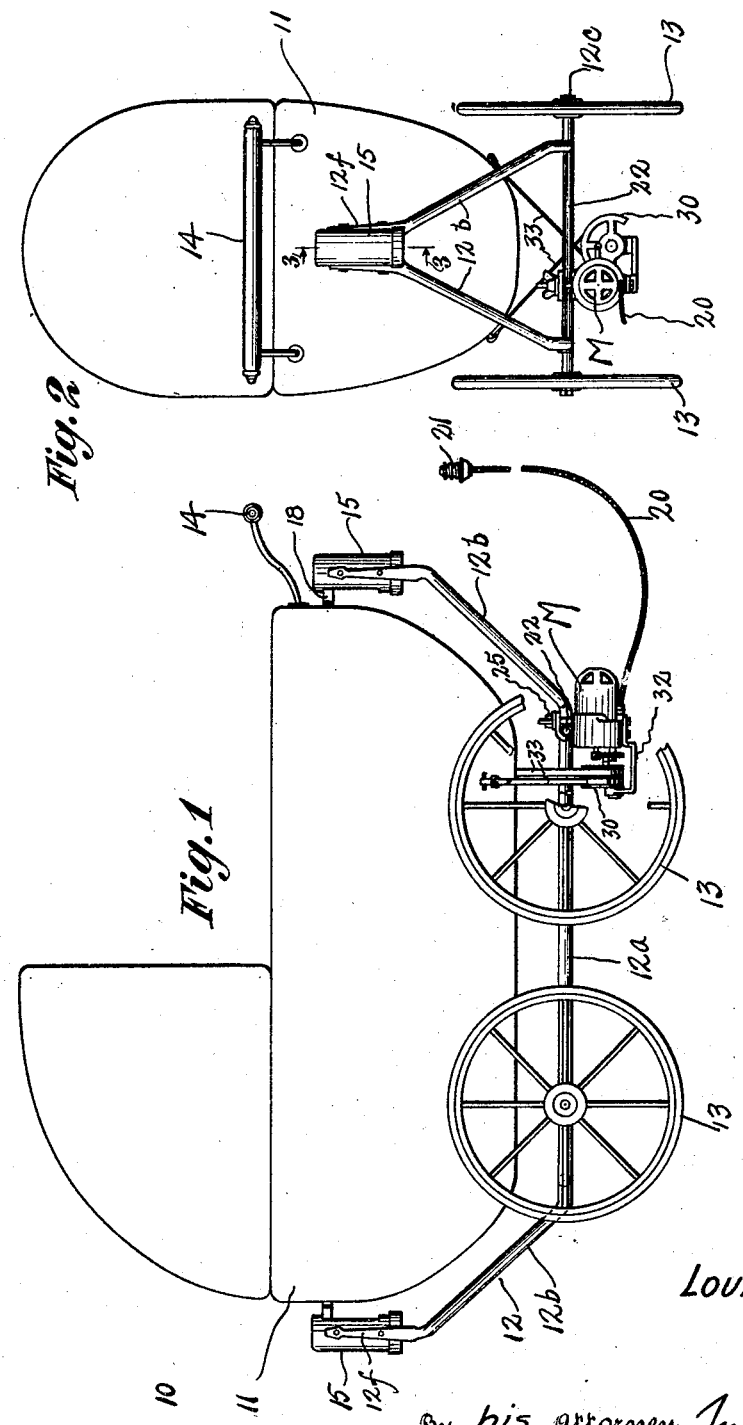

1,739,785

UNITED STATES PATENT OFFICE

LOUIS DAVIS, OF NEW YORK, N. Y.

ROCKING BABY CARRIAGE

Application filed December 6, 1927. Serial No. 238,198.

This invention relates to baby carriages, and has among its objects the provision of an improved device of this general character in which means is provided for automatically rocking the body of the baby carriage to put the baby to sleep so as to relieve the mother of the attention otherwise required, and to permit her to devote her time and effort to the other duties.

A further object of this invention is to provide improved means for rocking a baby carriage to any desired extent to most efficiently put the baby to sleep in a minimum amount of time, and with the greatest convenience to the baby.

A still further object of this invention is to provide improved means, including preferably an electric motor, to rock a baby carriage as above set forth, said means being simple and fool proof in operation, light and inexpensive in construction and noiseless and efficient in use to a high degree.

Other objects will in part be obvious and in part pointed out hereinafter.

Accordingly the invention is illustrated in the drawings in one embodiment thereof, the scope of said invention being indicated in the following claims.

In the drawings,

Fig. 1 is a view in side elevation with parts broken away to show details of construction, of a baby carriage embodying the invention.

Fig. 2 is an end elevation of same.

Fig. 3 is an enlarged sectional view of certain details of invention taken on line 3—3 of Fig. 2.

Fig. 4 is a view partly in section taken on the line 4—4 of Fig. 3.

Fig. 5 is an enlarged fragmentary view of details of the carriage rocking mechanism.

Fig. 6 is a plan view of mechanism shown in Fig. 5.

Referring in detail to the drawings, 10 denotes a baby carriage embodying the invention. Said baby carriage is of any type adapted to meet the objects of the invention, whether perambulatory or stationary, and is preferably of a conventional kind, having a body 11, a supporting frame 12, mounted on wheels 13, and a handle 14 being provided whereby the operator may conveniently push the carriage.

The frame 12 may take the form of any suitable or well known construction, but is here shown as being formed of tubular members, connected in any desired manner, as for instance, by welding, to form a relatively simple and rugged structure. Specifically said frame 12 includes a pair of longitudinally extending members having horizontal portions $12^a$ and upwardly inclined portions $12^b$ at the ends of the body 11. Axles $12^c$ for the wheels 13 are strongly connected to said frame in any suitable way, and may constitute cross braces for the frame. The portions $12^b$ terminate at their upper ends in an acute angle structure forming a hollow boss $12^d$ at each end of the body 11, and having a circular upstanding flange $12^e$. The boss $12^d$ can be pressed from the members $12^b$ or it may consist of a part separately constructed and welded to the said members.

Mounted in said boss $12^d$ are means for pivotally and resiliently supporting the body 11 of the carriage 10. Specifically, a cylindrical casing member 15 is provided having a lower end opening $15^a$ to receive a coaxial helical spring 16, upon which is positioned a pivotal plate 17. The plate 17 may have a pivot groove $17^a$ at its upper face, and depending center portion $17^b$ forming a shoulder $17^c$, for reliable engagement and seating on said spring. The casing 15 has a longitudinal side opening $15^b$ through which a bar 18 secured to the body 11 at a flange $18^a$, or the like, and terminating in a knife edge portion $18^b$ may be received to engage at the groove $17^a$. The spring may be initially compressed, so that bar 18 abuts the upper end of opening $15^b$, as at $15^c$, and since the upper portion $18^c$ of the knife edge conforms to the opening at $15^c$, unintended rocking of the carriage may be prevented while the carriage is empty. However, on placing the baby into the carriage, the spring will be compressed and the knife edge move downward slightly, and free and resilient rocking motion permitted.

The boss $12^d$ may form a closure for the lower end of the casing 15, or a cap $15^d$ may be provided in which the spring is seated, and which is effective through the closure and supporting action of the boss. Screws 15ᵉ may if desired secure the casing 15 to the lateral upward extending ends 12ᶠ of the frame 12, to retain the casing against removal.

To prevent any rocking motion of the carriage, whether manually or by the electrical automatic means, hereinafter described, a removable member or bolt 19 may be passed centrally through the casing and associated parts as for instance, through holes 15ᶠ in the casing and cap 15ᵈ, hole 18ᵈ in the knife edge member, hole 17ᵈ in member 17, and hole 12ᵍ in the boss 12ᵈ. The removable member may have an eye 19ᵃ at its upper end to permit it to be suspended in any safe and convenient place when not in use.

The means for automatically rocking the body 11 of the carriage 10, include an electric motor M connected by a detachable lead 20 and plug 21 to any source of house current. Said motor is hung from a cross bar 22 which may be permanently secured to frame 12. The means for suspending the motor may include a bracket plate 23 resting on bar 22, a bolt 24 extending from the motor to pass through said bracket plate, and a wingnut 25 threaded on the end of said bolt. The motor is thus detachable as for repairs or the like.

The motor rotates a worm 26 which meshes with a gear 27 mounted on a shaft 28 journaled in a part of the motor casing. An eccentric rod 29 connects the gear with a segment or cam 30 so as to impart an oscillatory motion to the segment. Said segment is mounted on a shaft 31 journaled in a bracket 32 secured to the bottom of the motor. The segment 30 has a pair of grooves 30ᵃ forming side flanges 30ᵇ, and pins 30ᶜ at each side of the segment pass through the flanges to form an adjustable hold for strap 33. The latter may be made of any suitable flexible or elastic material as for example, leather, and has two buckles 33ᵃ, 33ᵇ at its ends, the former being attached to the body 11 at hooks 11ᵃ thereof, and the latter engaging the pins 30ᶜ. As shown in Fig. 5, the straps are engaged to the lower pins 30ᶜ while to secure a lesser rocking action, buckles 33ᵇ would be opened and attached to a set of the pins higher on the segment.

When it is desired to take the carriage out of doors, the lead and plug is simply disconnected, thereby preventing the motor from being operated and the carriage may then be maniuplated in the usual manner.

It will be noted that a high speed motor geared as herein described to impart the relatively slow rocking motion required by a baby carriage, could be a very small motor, requiring a negligible amount of power.

What I claim as new, is:

1. A baby carriage comprising a frame, a body, means on the frame pivotally supporting said body, and resilient means supporting the pivotal means, in which the pivotal means includes a cylinder having an end opening to coaxially receive the resilient means, said cylinder having a longitudinal side opening, and means passing through said longitudinal opening and resting on said resilient means to pivotally support said body.

2. A baby carriage comprising a frame, a body, means on said frame pivotally supporting said body, and removable means passing through the means aforesaid to prevent pivotal action, in which the pivotal means includes a cylinder having a bottom end opening, a spring coaxially received into the cylinder through said opening, the frame having a bracket to receive said cylinder and form a closure for said opening, said cylinder having a longitudinal side opening, a pivot member resting on said spring, a knife member extending from said body to pivot on said pivot member, said pivot member and said cylinder having alined holes coaxial with said cylinder, and said removable means passing through said holes.

3. In a baby carriage having a frame and a body suspended on said frame; two pivot pins with knife edges secured in a longitudinal axis to the body; two springs and two rest plates on the frame for said two pivots, the knife edge of each engaging a rest plate for the easy rocking of the body, said knife edges, said rest plates, and a stationary part of the frame thereunder being provided with coaxial holes, and a removable member adapted to be passed through said holes and to lock the parts together to prevent a rocking of the body.

Signed at New York in the county of New York and State of New York this 7th day of November, A. D. 1927.

LOUIS DAVIS.